United States Patent

[11] 3,625,322

[72] Inventors: Hiroaki Nagamatsu; Katsuhiro Handa; Tetsuo Shimosaki, all of Hiroshima, Japan
[21] Appl. No. 872,631
[22] Filed Oct. 30, 1969
[45] Patented Dec. 7, 1971
[73] Assignee Toyo Kogyo Co., Ltd. Hiroshima, Japan
[32] Priorities Oct. 30, 1968
[33] Japan
[31] 43/79417;
Oct. 31, 1968, Japan, No. 43/79790; Oct. 31, 1968, Japan, No. 43/95252

[54] FRICTION COUPLING CONTROLLED BY VEHICLE SPEED AND MANIFOLD VACUUM
5 Claims, 3 Drawing Figs.

[52] U.S. Cl. ................................ 192/.032, 192/54, 192/85, 192/103 FA, 192/104 F, 74/752 C
[51] Int. Cl. ........................................ F16d 25/00, F16d 43/284
[50] Field of Search ........................ 192/.032, .033, .034, 3.31, 3.33, 85, 109 F, 104 F, 103 FA; 74/752 C

[56] References Cited
UNITED STATES PATENTS

| | | | |
|---|---|---|---|
| 2,728,427 | 12/1955 | Lucia | 192/.033 |
| 3,101,012 | 8/1963 | Christenson et al. | 192/104 F |
| 3,155,040 | 11/1964 | Shurts et al. | 192/104 F X |
| 3,163,270 | 12/1964 | Zingsheim | 192/3.27 |
| 3,324,983 | 6/1967 | Snoy et al. | 192/104 F X |

Primary Examiner—Benjamin W. Wyche
Attorney—Sughrue, Rothwell, Mion, Zinn & Macpeak ABSTRACT: The control system for an automatic transmission controls the flow of fluid to a friction clutch or brake to establish various drive gear ratios of a transmission including a friction-engaging mechanism to complete a power train between said shafts. A source of fluid for supplying a line pressure to said friction-engaging mechanism is provided. A vacuum motor is connected to the intake manifold of an engine. A regulator valve is disposed between the source of fluid and the friction-engaging mechanism to regulate the line pressure from the source. Valve means connected to said vacuum motor increase the line pressure in response to the decrease of the vacuum in the intake manifold by contacting with the regulator valve when said vacuum is below a predetermined value to hold the line pressure higher than the minimum value. When said vacuum is above a predetermined value, said value means releases itself from the regulator valve and at the same time communicates line pressure to a valve land area on the regulator valve to increase the force acting on said regulator valve and hold the line pressure higher than the minumum value. A pressure area of the regulator valve is coupled to the source of fluid through a restriction, and a speed-responsive device connects the pressure area to a sump or exhaust to reduce the line pressure above a predetermined speed for either of said shafts.

INVENTORS
TETSUO SHIMASAKI
HIROAKI NAGAMATSU
KATSUHIRO HANDA

BY Sughrue, Rothwell, Mion, Zinn & Macpeak
ATTORNEYS

FRICTION COUPLING CONTROLLED BY VEHICLE SPEED AND MANIFOLD VACUUM

BACKGROUND OF THE INVENTION

Field Of The Invention

This invention relates to an automatic transmission for an automotive vehicle, and more particularly to a control system for controlling the flow of fluid to a friction clutch or brake to establish various drive gear ratios of the transmission.

SUMMARY OF THE INVENTION

The present invention provides a control system for maintaining a suitable fluid pressure or line pressure for a friction engaging device such as a clutch or brake at a high value when the vehicle speed is low and at a low value when the vehicle speed is high. Particularly, the invention provides a control system for holding the line pressure at a high value when the torque-converting action of the torque converter is large and for holding it at a low value when the torque-converting action thereof is small.

The present invention provides a control system for lessening the effect of Bernoulli's force acting on a regulator valve for controlling the line pressure in response to the change of the vehicle speed. The system includes a switching valve for holding the line pressure at a high value at low vehicle speeds and also holds it at a low value at high speeds by a speed signal.

Another object of the invention provides a control system which switches the switching valve for controlling the signal force acting on the regulator valve in response to the centrifugal force acting on itself by coupling it to a vehicle speed responsive portion such as driven shaft so as to control the line pressure by the change in vehicle speed. If follows that the invention provides a control system for holding the line pressure at high pressure within a predetermined vehicle speed and also holds it at low pressure over a predetermined vehicle speed by fixing the switching valve to a rotating shaft such as, for example, a driven shaft of the transmission so as to hold the oil pressure within the oil passage connecting the high-pressure oil passage such as line pressure oil passage to the regulator valve at high or low values by opening or closing the switching valve.

The invention further provides a control system for controlling the line pressure in response to the torque transmitted to the transmission. Particularly, the control system controls the line pressure by detecting both the torque produced at the engine and the torque transmitted from the wheel. It means that if the line pressure is controlled merely by the torque produced at the engine, the minimum value thereof must be set at the maximum value of the pressure required for the friction-engaging mechanism at the engine braking state. Thus, if the line pressure is set, excess line pressure is produced for the pressure required for the friction-engaging mechanism at the normal driving state wherein the wheel is driven by the engine. The control system of this invention operates in such a manner that when the vehicle is driven in the normal state, the line pressure is increased in response to the torque generated at the engine and when the engine brake is operating, the line pressure is controlled to a higher value than the minimum value at the normal driving condition.

The invention further provides a control system which connects a vacuum motor operated by the vacuum within the intake manifold of an engine, through the switching valve and releases the above-mentioned connection in the engine brake state and switches the switching valve so as to supply high-pressure fluid such as the line pressure, to the regulator valve in the increasing direction of the line pressure.

DESCRIPTION OF THE PREFERRED EMBODIMENT

Figure 1:
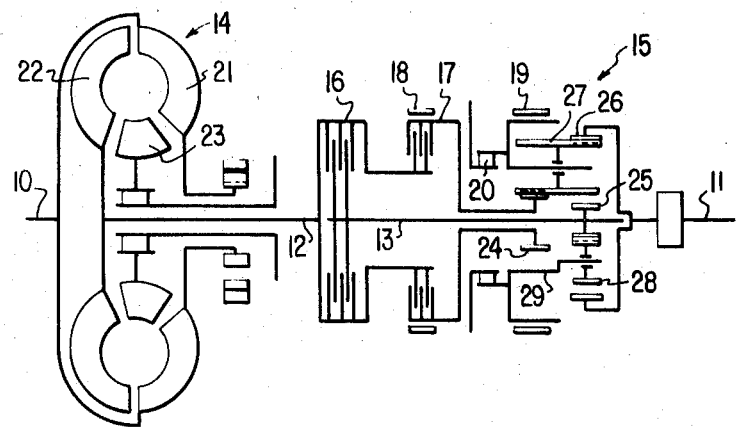
FIG 1 is a schematic view of the transmission to which is applied the control system of the present invention.

Reference is now made to FIG. 1, which shows the schematic structure of the transmission. The transmission used with the control system of the present invention comprises a drive shaft 10, a driven shaft 11, a first intermediate shaft 12 and second intermediate shaft 13; these shafts are all disposed coaxially and rotatable within a casing. The transmission also comprises a torque converter 14, a planetary gear set 15, a front clutch 16, a rear clutch 17, a front brake 18, rear brake 19 and one-way clutch 20. The torque converter 14 comprises a pump 21, a turbine 22 and a stator 23. The planetary gear set 15 comprises a front sun gear 24, a rear sun gear 25, a ring gear 26, long pinion gears 27, short pinion gears 28 and a gear carrier 29.

The thus-constructed transmission may provide low-, intermediate-, and high-speed forward drive by selectively engaging the aforesaid clutches and brakes.

Figure 2:
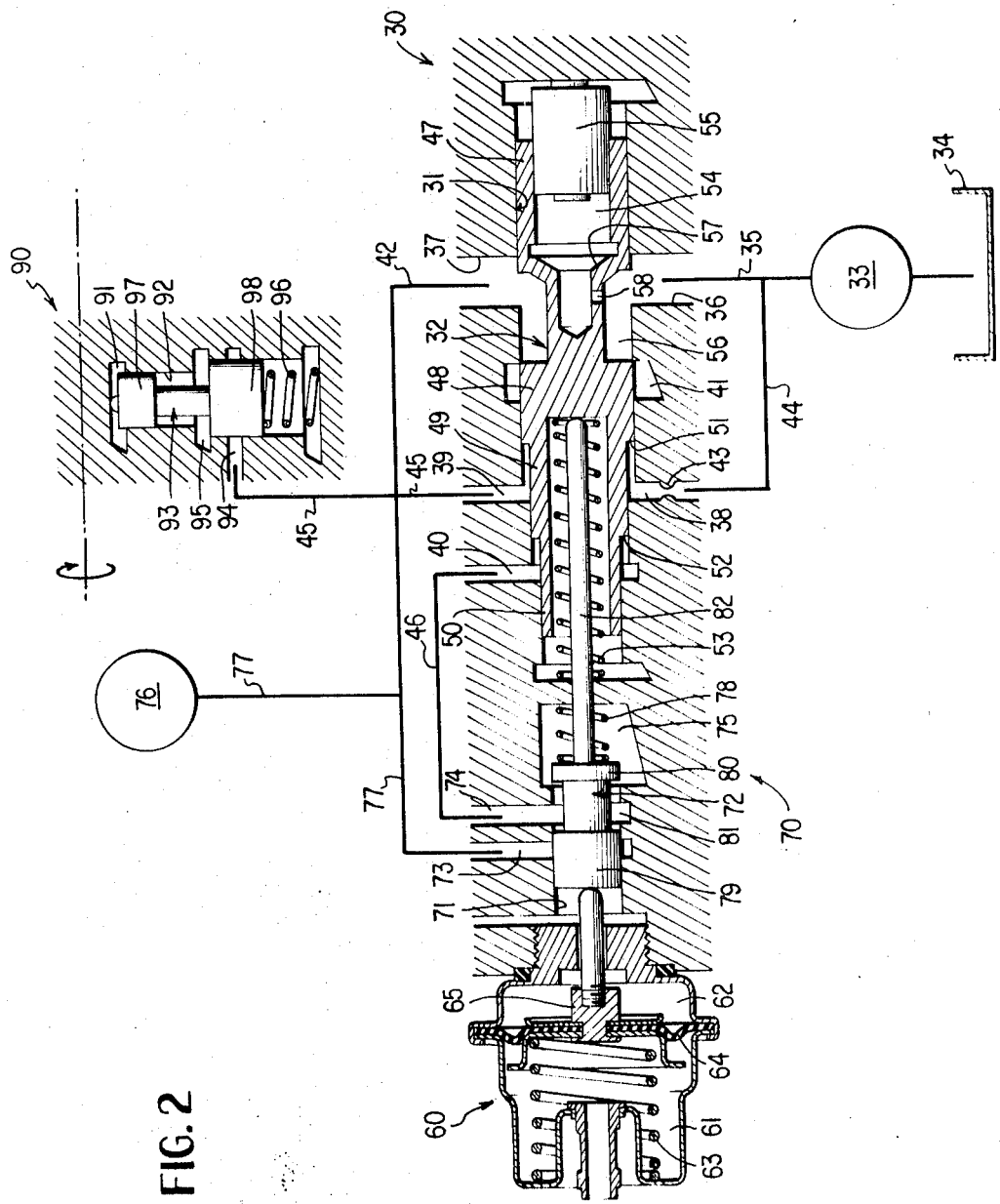
FIG. 2 is a hydraulic pressure circuit diagram showing the main part of the control system of the invention.

The control system of the invention for controlling the line pressure applied to the friction engaging mechanism of the aforementioned transmission comprises various valves as shown in FIG. 2.

THE REGULATOR VALVE

The regulator valve 30 comprises a piston 32 slidably inserted into a cylinder 31 to regulate the fluid pressure supplied through a conduit 35 from an oil tank 34 by an oil pump 33. The cylinder 31 includes oil passage ports 36, 37, 38, 39, and 40, and an exhaust oil port 41. The oil passage port 36 communicates with the conduit 35, the oil passage port 37 communicates with a conduit 42, and the oil passage port 38 communicates with the conduit 35 through a conduit 44 having a restriction 43. The oil passage port 39 communicates with a conduit 45 and the oil passage port 40 communicates with a conduit 46. The piston includes lands 47, 48, 49, and 50. Land 48 has a larger diameter than land 49, and land 49 has a larger diameter than land 50. Stepped portions 51 and 52 are provided between the lands 48 and 49, and between the lands 49 and 50, respectively.

The piston 32 is urged rightwardly of the drawing by a spring 53 and has a space 54 formed therewithin. The space 54 has an auxiliary piston 55 slidably inserted therein. The space 54 communicates with an annular groove 56 formed between the lands 47 and 48 through a restriction 58. Fluid pressure supplied from conduit 35 or line pressure is supplied to the space 54 to urge the piston 32 leftwardly by acting on pressure area 57.

THE VACUUM MOTOR

The vacuum motor 60 is connected, for example, to an intake manifold (not shown) of an engine and comprises a chamber 61 to which the vacuum within the intake manifold is directed. A chamber 62 receives atmospheric pressure. A diaphragm 64 is urged by a spring 63 to the right. The diaphragm 64 is fixed at its edge and at the center to push rod 65.

THE COMPENSATING VALVE

Compensating valve 70 comprises a piston 72 slidably disposed within a cylinder 71, coaxially with the cylinder 31 of the regulator valve 30. The cylinder 71 comprises oil passage ports 73 and 74, and an oil exhaust port 75. The oil passage port 73 is connected to a conduit 77 communicating with the friction-engaging mechanism 76 such as the clutches or brakes and the conduit 42. The piston 72 is urged leftwardly of the drawing so as to follow the push rod 65 of the vacuum motor 60 by a spring 78. The piston 72 includes an annular groove 81 provided between lands 79 and 80. An extension 82 extends within the cylinder of the regulator valve and projects rightwardly of the drawing of the piston 72. When the vacuum is higher than a predetermined value, the piston 72 is removed from the contact with the piston 32 of the regulator valve 30 so that the oil exhaust port 75 is closed from the oil passage ports 73 and 74, and when the vacuum is lower than a predetermined value, it contacts the end surface of the piston 32 by means of extension 82, as shown, to shut off the oil passage port 73 from the oil passage port 74. The vacuum over a predetermined value is a vacuum in the engine brake state while the vacuum less than a predetermined value is a vacuum in the state wherein the wheels are driven by the engine.

THE SPEED RESPONSIVE SWITCHING VALVE

The speed-responsive switching valve 90 is fixed to the driven shaft II and comprises a casing 91 rotating together with the driven shaft. The casing 91 is formed with a cylinder 92 therein. The cylinder 92 comprises oil passage ports 94 and oil exhaust port 95 to be switched by the piston 93 slidably disposed therein. The piston 93 slides in the cylinder 92 under centrifugal force which acts on itself when the driven shaft 11 is rotated. The piston 93 is urged by a spring 96 against centrifugal force. The piston 93 comprises lands 97 and 98. Accordingly, the piston 93 slides outwardly so as to couple the oil passage port 94 with the oil exhaust port 95 when a predetermined value of centrifugal force acts on itself.

OPERATION

In the state as shown in the drawings, the oil pump 33 operates to feed oil into the conduit 35, whereupon the oil within the conduit 35 is supplied through the oil passage port 36 of the regulator valve 30, annular groove 56 and restriction 58 to the space 54, and through the conduit 44 and restriction 43 to the oil passage port 38 and then from the oil passage port 38 through the oil passage port 39 and the conduit 45 to the oil passage port 94 of the speed-responsive switching valve 90, respectively. Conduit 42 is not connected to conduit 45. In such a state, the vehicle is stationary so that the driven shaft II is not driven and accordingly the speed-responsive switching valve 90 is closed by the land 98 overlying the oil passage port 94 as shown. The result is that the pressure within the conduit 45 is held at the same pressure as the line pressure in the conduit 35. Accordingly, the line pressure supplied through the conduits 42 and 77 to the friction engaging mechanism 76 is held on any point of the line $a-b$ in FIG. 3 by the balance between the pressing force pushing the piston 32 leftwardly of the drawing by the fluid pressure acting on the pressure area 57 and the combined pressing force pushing the piston 32 rightwardly of the drawing by the fluid pressure acting on the pressure area 51 and the vacuum motor 60 and spring 53. It follows that the line pressure is held to a minimum value of point $b$ in the idling state of the engine and increases along the line $b-a$ in response to the increase in torque produced at the engine or the decrease of the vacuum within the chamber 61 of the vacuum motor 60. In such a state, the vehicle will start to rotate the driven shaft II so that the piston 93 of the speed-responsive switching valve 90 tends to slide outwardly by the centrifugal force acting on itself, but since the centrifugal force is not sufficient to slide the piston 93 outwardly against the force of the spring 96, the line pressure is held on the area surrounded by the points $a-b-c-d$. In such a state, if the speed of the driven shaft II reaches above the point A, the piston 93 of the speed-responsive switching valve 90 slides outwardly against the spring 96 under the centrifugal force, so that the oil passage port 94 communicates with the oil exhaust port 95. Thereby, the line pressure within the conduit 45 exhausts through the exhaust port 95 to become substantially zero, with the result that the force pushing the piston 32 rightwardly of the drawing by the line pressure acting on the pressure area 51 will decrease in a stepped manner. Accordingly, the line pressure regulated by the regulator valve 30 is held to the area surrounded by the points $e-f-g-h$ in FIG. 3 by the balance between the pressing force pushing the piston 32 leftwardly of the drawing by the fluid pressure acting on the pressure area 57 and the pressing force pushing the piston 32 rightwardly by the vacuum motor 60 and spring 53.

It means that the pressure supplied to the friction engaging mechanism 76 is held to the area surrounded by the points $a-b-c-d$ when the torque amount converted by the torque converter 14 is large or when the speed of the driven shaft II is low while held to the area surrounded by the lower points $e-f-g-h$ in comparison with the above-described case when the torque amount converted by the torque converter is small or when the speed of the driven shaft II is high.

When the line pressure is lowered from the area surrounded by the points $a-b-c-d$ to the area surrounded by the points $e-f-g-h$, since the conduit 45 is connected to the oil exhaust port 95 of the speed-responsive switching valve 90, so that the excess oil conduit 44 is exhausted through the restriction 43, and the conduit 45 at the oil exhaust port 95 of the speed-responsive switching valve 90, with the result that the exhaust amount of the oil exhausted from the oil exhaust port 41 of the regulator valve 30 becomes relatively small, the Bernoulli's force acting on the piston 32 is reduced. It means that at the piston of the regulator valve for regulating the line pressure when the excess oil is exhausted from the oil exhaust port the force due to the pressure difference produced around the piston or Bernoulli's force acts to regulate the regulator valve with uncertainty and the Bernoulli's force is varied by the amount of oil exhausted from the oil exhaust port. Accordingly, if the flow rate of the exhausted oil from the oil exhaust port 41 of the regulator valve 30 is decreased, the Bernoulli's force acting on the piston 32 is reduced so as to positively regulate the same.

Since the aforementioned description has related to the state wherein the wheel is driven by the engine by depressing the accelerator pedal (not shown), the engine braking state wherein the engine is driven by the wheels with the accelerator pedal closed as when the vehicle is running down a descent will be now described.

If the vacuum within the intake manifold increases above point B upon engine idling so that the push rod 65 of the vacuum motor 60 slides to the left, the piston 72 of the compensating valve 70 moves to the left, followed by the push rod 65 due to the tension of the spring 78. In such a case, if the vacuum within the intake manifold is within the range from the point B to the point C, the extension 82 of the piston 72 moves out of contact with the piston 32 of the regulator valve 30. Accordingly, the line pressure supplied to the friction engaging mechanism 76 is held to the area surrounded by the points $b-i-j-c$ in FIG. 3 by the balance between the pressing force pushing the piston 32 leftwardly of the drawing by the line pressure acting on the pressure area 57 of the piston 32 and the pressing force pushing the piston 32 rightwardly of the drawing by the spring 53 and the line pressure acting on the pressure area 51, if the driven shaft speed is within the point A. If the driven shaft speed is above the point A, as described previously, the line pressure within the conduit 45 is exhausted by the speed responsive switching valve 90 so that the line pressure is held to the area surrounded by the points $f-k-l-g$ by the balance between the pressing force pushing the piston 32 leftwardly of the drawing by the line pressure acting on the pressure area 57 and the pressing force pushing the piston 32 rightwardly of the drawing by the spring 53. It means that, if the vacuum within the intake manifold is within the range from point B to point C, the line pressure held constant against the change of the vacuum.

Figure 3:
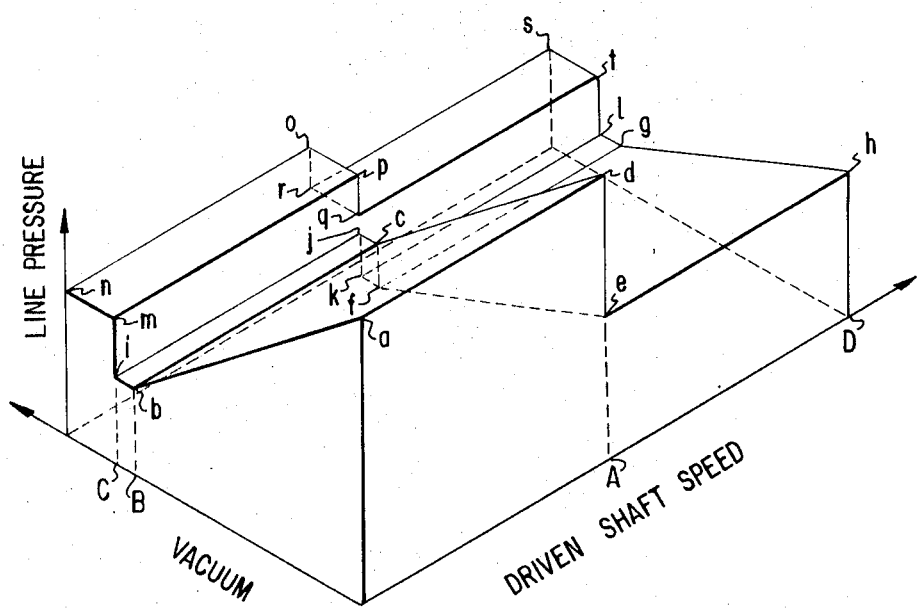
FIG. 3 is a graphical representation of the characteristics of the line pressure obtained by the control system of the invention.

However, in FIG. 3, the vacuum range within the intake manifold from point B to point C exists only when the depressing amount of the accelerator pedal is zero and yet the speed of the driven shaft II is low. And, if the accelerator pedal is released from the state where the wheels are driven by the engine and the vacuum at that time is above point C, the extension 82 is released from contact with the piston 32 by the leftward movement of the piston 72 of the compensator valve 70 in sequence with the leftward movement of push rod 65 of the vacuum motor 60. At the same time the oil passage port 73 communicates with the oil passage port 74. Thereby the line pressure within the conduit 77 is supplied through the oil passage ports 73 and 74 and conduit 46 to the oil passage port 40 then to the pressure area 52 so that the piston 32 is urged to the right. Accordingly, the line pressure supplied through the conduits 42 and 77 to the friction engaging mechanism 76 is held to the area surrounded by the points $m-n-0-p$ in FIG. 3, if the speed of the driven shaft ll is within the point A. It is held to the area surrounded by the points $q-r-s-t$, is the speed of the driven shaft ll is over the point A. This value is higher than the value of the line pressure $b-c$ and $k-l$ of the idling state so that the friction-engaging mechanism 76 is positively engaged against the maximum value of the torque transmitted from the wheel.

It is understood from the foregoing description that the control system improved by the invention holds the line pressure supplied to the friction-engaging mechanism at a high value when the converted amount of the torque converter 14 is large and holds the line pressure at a low value when the converted amount of the torque converter 14 is small and when the line pressure is reduced, the exhaust flow rate of the excess oil from the regulator valve 30 may be decreased.

It is also understood that the improved control system of the invention increases the line pressure in response to the increase of the torque produced at the engine or the decrease of the vacuum within the intake manifold, when the wheels are driven by the engine by depressing of the accelerator pedal, while the line pressure is held higher than the line pressure in the idling state of the engine when the engine is driven by the wheels in the engine braking state by releasing the accelerator pedal.

It is understood that since the present control system comprises a switching valve for holding the line pressure line of a high or low value by being fixed to a rotating portion such as driven shaft ll, rotating at the speed corresponding to the speed of the respective portion of the torque converter, so that it is transferred by the centrifugal force acting on the switching valve, the oil passage is simplified thereby.

The switching valve may be switched by the change of the governor pressure or speed-responsive fluid pressure supplied from a governor valve of general use so that the line pressure may be varied in response to the speed of the various portions of the transmission. Accordingly, in the present invention, the pump loss of the oil pump may be minimized at the same time the transfer from one gear ratio to another gear ratio may be positively achieved without any shock.

What is claimed is:

1. A control system for an automatic transmission having a drive shaft, a driven shaft, and means including at least one friction-engaging mechanism to complete a power train between said shafts, said control system comprising, a fluid pressure source for supplying a line pressure to said friction-engaging mechanism, a regulator valve for regulating the line pressure from said fluid pressure source, said regulator valve including a plurality of fluid pressure areas formed thereon, a first conduit connecting the output of said fluid pressure source with a first pressure area on said regulator valve, a second conduit connecting the output of said fluid pressure source with a second pressure area on said regulator valve of increasing the regulated line pressure in said first conduit, said second conduit having an orifice restriction formed therein, a third conduit connecting said first pressure area on said regulator valve with said friction-engaging mechanism for actuation thereof, a switching valve operatively connected to said driven shaft, said switching valve having a piston movably contained within a bore formed in a housing, said housing adapted for rotation by said driven shaft to cause said piston to be moved radially outwardly by centrifugal force, a biasing means positioned between said housing and said piston to bias said piston radially inwardly in opposition to the centrifugal forces acting thereon, said housing having a first and a second oil passage formed therein, said first passage communicating with said second pressure area on said regulator valve, said second passage forming an oil exhaust port, said piston being moved radially outwardly in response to the rotation of said driven shaft to connect said first port with said second port to reduce the line pressure supplied to said friction engaging mechanism when the speed of said driven shaft exceeds a predetermined value.

2. A control system as claimed in claim 1, wherein said piston of said switching valve has a first position within a predetermined range of centrifugal forces acting thereon for blocking communication of said first passage with said second passage, and movable to a second position above a predetermined value of said centrifugal forces to connect said first passage with said second passage, whereby the line pressure is maintained at a predetermined maximum value when said piston is in said first position and at a predetermined minimum value when said piston is moved to said second position, wherein the line pressure supplied to said friction engaging mechanism is reduced in a stepped manner above a predetermined shaft speed.

3. A control system for an automatic transmission as claimed in claim 1, further comprising, a vacuum motor connected with an intake manifold of an engine, said vacuum motor having a reciprocable rod actuated in response to the vacuum of said intake manifold, a compensating valve disposed in said third conduit, said compensating valve including a valve disposed in said third conduit, said compensating valve including a valve piston adapted to move in accordance with the movement of said reciprocable rod to selectively block or permit pressure distribution of said line pressure to a third pressure area on said regulator valve, said valve piston having one end in contact with said regulator valve to urge said regulator valve in the direction opposite to the pressure force acting on said first pressure area when the vacuum in said intake manifold is below a predetermined value, and being adapted to move out of contact with said regulator valve to vary the value of pressure supplied to said third pressure area when the vacuum in said intake manifold increases above a predetermined value, whereby, said line pressure decreases to a minimum value according to the increase of said intake manifold vacuum when said vacuum is below a predetermined value and is maintained at a pressure higher than said minimum value when said vacuum is above a predetermined value.

4. A control system for an automatic transmission as claimed in claim 3, wherein said valve piston has an extension formed on one end thereof in contact with said regulator valve, and having a spring adapted to bias said valve piston into contact with said reciprocable rod of said vacuum motor.

5. A control system for an automatic transmission as claimed in claim 1, wherein said regulator valve includes a spring-biasing means for applying a biasing force to said regulator valve in a direction opposite the hydraulic force acting on said first pressure area.

* * * * *

UNITED STATES PATENT OFFICE
CERTIFICATE OF CORRECTION

Patent No. 3,625,322            Dated December 7, 1971

Inventor(s) Hiroaki Nagamatsu, Katsuhiro Handa and Tetsuo Shimosaki

It is certified that error appears in the above-identified patent and that said Letters Patent are hereby corrected as shown below:

Column 5, line 64 (Claim 1, line 12), after "regulator valve", change [of] to ----- for -----.

Column 6, lines 37-38 (Claim 3, lines 6-7), delete [said compensating valve including a valve disposed in said third conduit].

Signed and sealed this 5th day of September 1972.

(SEAL)
Attest:

EDWARD M. FLETCHER, JR.            ROBERT GOTTSCHALK
Attesting Officer            Commissioner of Patents